US008671061B2

(12) United States Patent
Ho et al.

(10) Patent No.: US 8,671,061 B2
(45) Date of Patent: Mar. 11, 2014

(54) SYSTEM, METHOD AND APPARATUS FOR CONDUCTING A SECURE TRANSACTION OVER A CALL

(75) Inventors: Chi Fai Ho, Palo Alto, CA (US); Shin Cheung Simon Chiu, Palo Alto, CA (US)

(73) Assignee: TP Lab, Inc., Palo Alto, CA (US)

( * ) Notice: Subject to any disclaimer, the term of this patent is extended or adjusted under 35 U.S.C. 154(b) by 1132 days.

(21) Appl. No.: 11/197,575

(22) Filed: Aug. 3, 2005

(65) Prior Publication Data
US 2007/0260555 A1    Nov. 8, 2007

(51) Int. Cl.
*G06Q 20/00* (2012.01)
*G06F 21/00* (2013.01)

(52) U.S. Cl.
USPC .......................................................... 705/64

(58) Field of Classification Search
USPC ............... 705/64, 16, 21, 59, 71; 380/44, 262, 380/278, 279
See application file for complete search history.

(56) References Cited

U.S. PATENT DOCUMENTS

| | | | | |
|---|---|---|---|---|
| 5,715,314 A | * | 2/1998 | Payne et al. | 705/78 |
| 6,049,602 A | * | 4/2000 | Foladare et al. | 379/265.04 |
| 2001/0039535 A1 | * | 11/2001 | Tsiounis et al. | 705/71 |
| 2002/0010640 A1 | * | 1/2002 | Dutta et al. | 705/26 |
| 2002/0010679 A1 | * | 1/2002 | Felsher | 705/51 |
| 2002/0065774 A1 | * | 5/2002 | Young et al. | 705/41 |
| 2002/0120582 A1 | * | 8/2002 | Elston et al. | 705/64 |
| 2002/0179704 A1 | * | 12/2002 | Deaton | 235/383 |
| 2003/0125054 A1 | * | 7/2003 | Garcia | 455/466 |
| 2004/0049455 A1 | * | 3/2004 | Mohsenzadeh | 705/40 |
| 2004/0107170 A1 | * | 6/2004 | Labrou et al. | 705/64 |
| 2005/0222961 A1 | * | 10/2005 | Staib et al. | 705/64 |
| 2006/0235758 A1 | * | 10/2006 | Schleicher | 705/26 |

FOREIGN PATENT DOCUMENTS

WO    PCT/US 06/25411    1/2007

* cited by examiner

*Primary Examiner* — Dante Ravetti
(74) *Attorney, Agent, or Firm* — North Shore Patents, P.C.; Michele Liu Baillie

(57) ABSTRACT

Embodiments of the present invention include methods, systems and apparatuses for conducting secure transactions over a call. Users can initiate a secure transaction over a call, such as a telephone call, in which the identities of up to all participants can be validated prior to sending or receiving of payment, financial or other sensitive information. A transaction module collects and verifies all necessary transaction information and resources. User can be prompted to confirm or approve the transaction prior to completion of the transaction. Summaries of the transaction can be sent to users or stored in record keeping.

13 Claims, 7 Drawing Sheets

SYSTEM, METHOD AND APPARATUS FOR CONDUCTING A SECURE TRANSACTION OVER A CALL

BACKGROUND

1. Field

This invention relates generally to telecommunications, and in particular, to a system, method and apparatus of conducting a secure transaction during a call.

2. Related Art

People typically use phone calls for person-to-person communication. Occasionally, a consumers use phone calls to make a purchase or place an order. During such commercial use, businesses often ask customers for a credit card number and verbal credit card approval to pay for goods and services. Verbal transmission of consumer credit card or other financial account information via a phone call presumes a certain level of trust between the customer and the business. The consumer assumes they can trust the business to which they are giving their credit card number and the business assumes they can trust that the information that the consumer is giving actually belongs to that consumer. There are consumers and businesses alike that take advantage of the presumption of trust to commit various types of fraud via phone calls. Despite the fact that phone call transactions are wrought with risks of fraud, for better or worse, many consumers and businesses tend to accept such risks for the sake of convenience or profit.

The risks involved with giving credit card or other payment information via a phone call are best illustrated with examples. Consider, for instance, a scenario in which a consumer is planning a vacation cruise through a travel agent. The consumer calls the travel agent to organize all the details of the trip. After the consumer, with the help of the travel agent, decides on the cruise line, cabin size, deck level, ground/air transportation and other pertinent plans, the travel agent informs the consumer that the reservation requires immediate payment. The consumer indicates that they would like to pay with a credit card, and gives the travel agent the credit card information and other information needed to validate the transaction possibly including, but not limited to, name, billing address, expiration date or card verification number or code such as Card Verification Value 2 (CVV2), Card Validation Code (CVD) or Card Identifier (CID). Unbeknownst to the consumer, the travel agent has written the credit card number and other information down on a piece of paper. The travel agent might not have any fraudulent intentions, however the piece of paper with the customers credit card information was left out in the open.

Upon returning from the cruise, the consumer comes to discover that there are several large value charges made to the credit card account used to book the cruise from locations that would have been impossible for the consumer to have visited whilst on the cruise. It is later discovered that the travel agent left the consumer's credit card information out in the open. Later on, a walk-in customer came into the travel agent's office, copied the information and used it make several fraudulent purchases.

In another scenario, a university student uses a phone registration system to register for the upcoming semester. After selecting the courses and class hours, the phone registration system instructs the student to pay for the registration. The student chooses to pay with a credit card. The registration system prompts the student for credit card information, and asks the student to agree with the payment. The student agrees accordingly. The registration system charges the credit card for the registration fee. Though the student might be happy that he gets all the desired classes, he is not aware that the registration system has kept a record of his credit card information, including the credit card number and expiration date.

Later on, another university student breaks into the university's computers, including the registration system, giving him access to all the registration records, including all the records of students with stored credit card information.

The common acceptance of the above example fraud-prone payment over the phone systems is probably due to the fact that the people do not conduct such transaction frequently, or the fact that the population using such systems is relatively small.

Thus, there is a need for a system, method and apparatus for conducting transactions over a call that will improve security, reliability and promote user trust and consumer confidence. The present invention solves these and other problems by providing transaction methods that can be initiated over a call wherein the identity of up to all involved parties and other information can be discovered and verified.

SUMMARY

Embodiments of the present invention include systems and methods of conducting a secure transaction over a call.

In one embodiment, users can connect via a call network and initiate a transaction through either the call network or a transaction module. The transaction module can connect to the call network or directly to the user.

In one embodiment, the transaction module comprises a transaction gatekeeper, a transaction information gatherer, a transaction verifier, a transaction approver, and a transaction notifier to validate users' identities, collection transaction information, verify transaction information, approve the transaction and notify users, respectively.

In another embodiment, customers can initiate a secure payment to a merchant using a credit card or debit card over a telephone call across a telephone network using the transaction module to handle the processing of the transaction.

Additional embodiments will be evident from the following detailed description and accompanying drawings, which provide a better understanding of the nature and advantages of the present invention.

DETAILED DESCRIPTION

Figure 1:
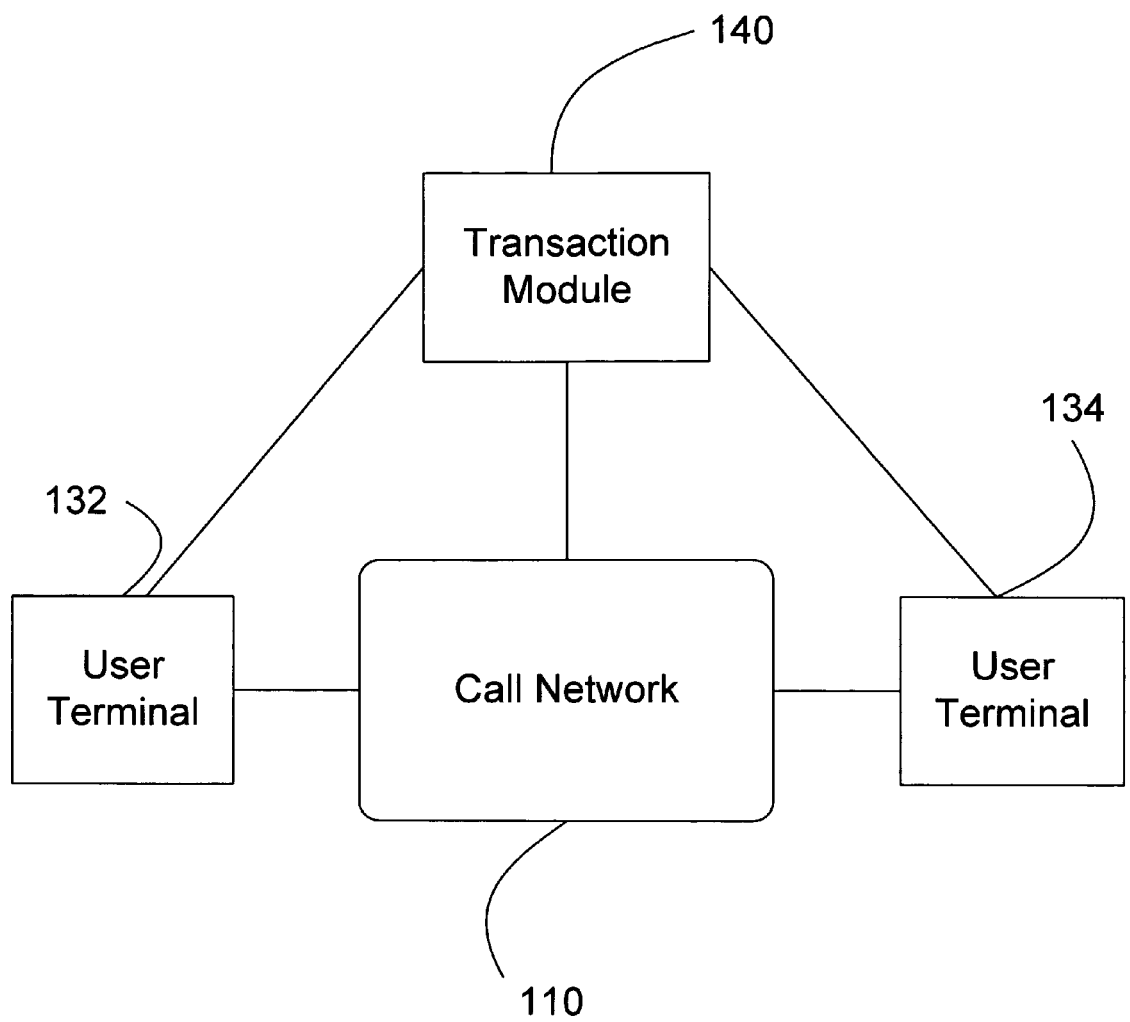
FIG. 1 is a diagram illustrating a system to conduct secure transactions over a call according to one embodiment of the present invention.

FIG. 1 illustrates a block diagram of a system for conducting a transaction over a call. User terminal 132 and user terminal 134 are conducting a call over a call network 110. In one embodiment, call network 110 includes a public telephone network. In another embodiment, call network includes a private telephone network. In one embodiment, the call includes a phone call. During the call, one or both user terminals can initiate a transaction. User terminals exchange information related to the transaction and user terminal 132 and user terminal 134 are ready to approve the transaction. In one embodiment, user terminal 132 requests transaction module 140 to approve the transaction. Transaction module 140 conducts a transaction approval process. After transaction module 140 completes the transaction approval process, user terminal 132 and user terminal 134 can resume the call.

Figure 2:
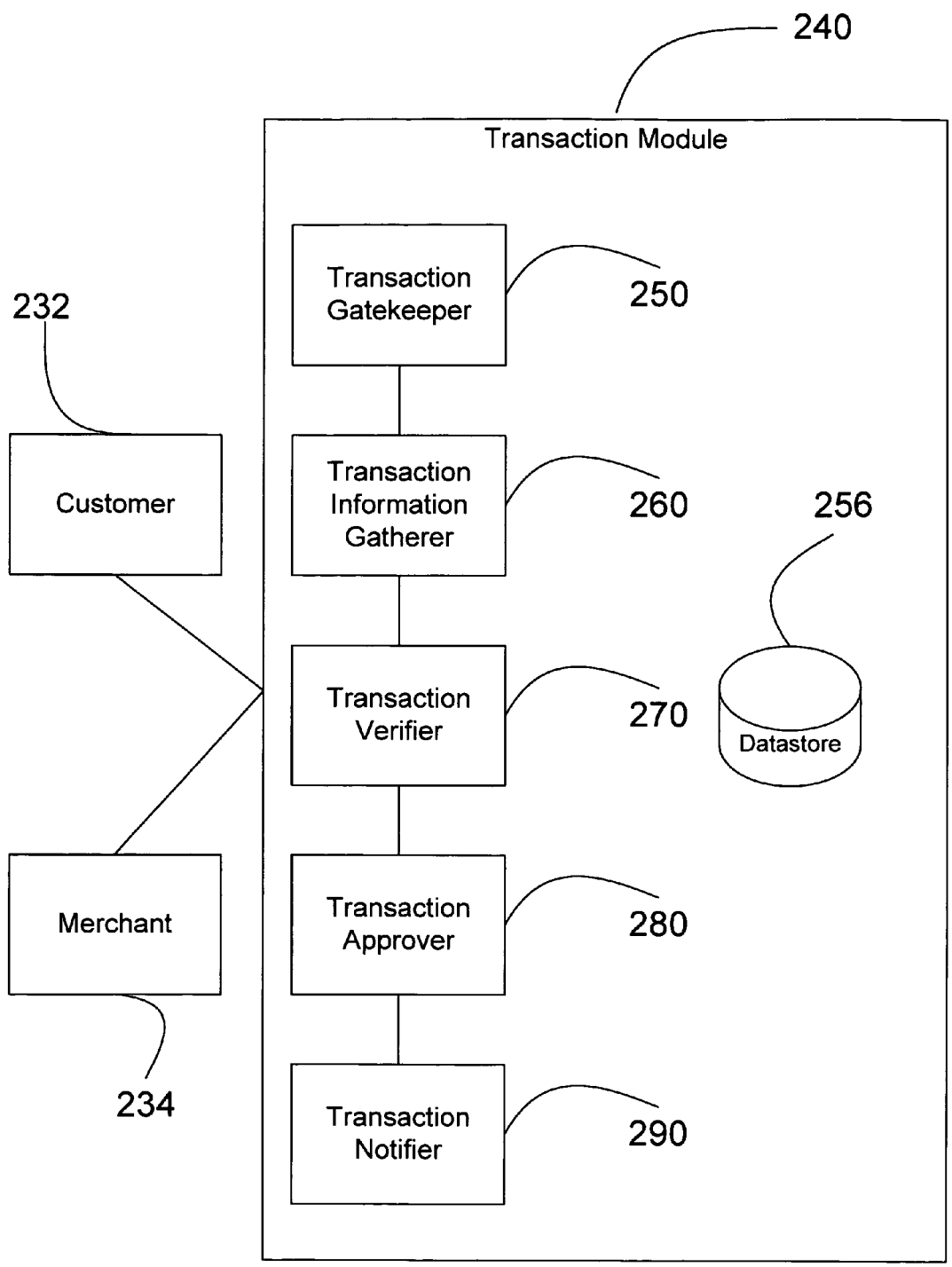
FIG. 2 is a diagram illustrating a transaction module according to one embodiment of the present invention.

FIG. 2 illustrates a block diagram of a transaction module according to one embodiment of the present invention. Either customer 232 or merchant 234 represents functionality or devices analogous or similar to either user terminal 132 or user terminal 134. In one embodiment, customer 232 can initiate approval of a transaction through transaction module 240. In one embodiment, transaction module 240 comprises sub-modules including, but not limited to, a transaction gatekeeper 250, a transaction information gatherer 260, a transaction verifier 270, a transaction approver 280, a transaction notifier 256 and a datastore 256. In another embodiment, any number of the sub-modules can be combined with any number of other sub-modules to perform any number of the same functions as described herein.

In one embodiment, transaction module 240 can communicate with customer 232 and merchant 234. Before or during a transaction, transaction gatekeeper 250 validates the identity of customer 232. In one embodiment customer 232 provides a user identity to transaction gatekeeper 250. Transaction gatekeeper 250 matches the user identity with the information in datastore 256. If the user identity that customer 232 provides matches an identity transaction gatekeeper retrieves from datastore 256, transaction gatekeeper 250 passes any available transaction information to transaction information gatherer 260. In one embodiment, customer 232 does not provide a user identity and transaction gatekeeper 250 automatically passes any available transaction information to transaction information gatherer 260.

Transaction information gatherer 260 collects information related to the transaction. Customer 232 can provide the customer transaction information to transaction information gatherer 260. Customer transaction information includes information pertinent to the transaction. In one embodiment, the customer transaction information includes a customer identity used in the transaction and a merchant identity used in the transaction. In one embodiment, the customer transaction information includes a merchant transaction identity. In one embodiment, the customer transaction information includes a monetary amount. Transaction information gatherer 260, using the merchant identity used in the transaction, can communicate with merchant 234 and verify up to all of the customer transaction information relating to the merchant. In one embodiment, transaction information gatherer 260 can verify merchant identity and the customer identity used in the transaction. In another embodiment, transaction information gatherer 260 can verify the merchant transaction identity. In yet another embodiment, transaction information gatherer 260 can verify the monetary amount.

In one embodiment merchant 234 provides merchant transaction information to transaction information gatherer 260. In another embodiment, the merchant transaction information includes a merchant transaction identity. In another embodiment, the merchant transaction information includes a monetary amount.

Transaction information gatherer 260 can present customer 232 with customer transaction summary information that summarizes information in the customer transaction information and the merchant transaction information. In one embodiment, the customer transaction summary information includes the customer identity used in the transaction, the merchant identity used in the transaction and the merchant transaction identity. In one embodiment, the customer transaction summary information also includes a monetary amount. In another embodiment, the customer transaction summary information includes additional customer related information included in the customer transaction information, such as payment information. In one embodiment, the customer transaction summary information includes additional customer related information in the merchant transaction information such as product information, shipment information, schedule information, or instruction information. In another embodiment, transaction information gatherer 260 asks if customer 232 agrees to proceed.

Transaction information gatherer 260 can present to merchant 234 merchant transaction summary information that summarizes merchant related information in the customer transaction information and the merchant transaction information. In one embodiment, the merchant transaction summary information includes the customer identity used in the transaction, the merchant identity used in the transaction, the merchant transaction identity. In another embodiment, the merchant transaction summary information also includes the monetary amount. In one embodiment, the merchant transaction summary information includes additional merchant related information included in the customer transaction information, such as shipment information, schedule information or instruction information. In one embodiment, the merchant transaction summary information includes additional merchant related information in the merchant transaction information such as fund receiving information, product information, shipment information, schedule information or instruction information. In one embodiment, transaction information gatherer 260 asks if merchant 234 agrees to proceed.

In one embodiment, transaction verifier 270 checks to see if the necessary resources are extant to complete the transaction. Transaction verifier 270 checks if customer 232 has necessary resources to complete the transaction. In one embodiment, transaction verifier 270 checks if customer 232 has sufficient credit to pay the monetary amount.

In one embodiment, transaction module 240 is a credit card or a debit card transaction system. Customer 232 has a credit card account with transaction module 240. The credit card or debit card account information is stored in datastore 256. Transaction verifier 270 checks the account of customer 232 and determines if the credit card or debit card account has sufficient credit or funds to pay the monetary amount. In another embodiment, customer 232 provides, in the customer transaction information, payment information such as credit card information or debit card information. Transaction verifier 270 checks the credit card company or the debit card company to see if customer 232 has sufficient funds to pay the monetary amount.

Transaction verifier 270 checks if merchant 234 has necessary resources to complete the transaction. In one embodiment, transaction verifier 270 checks if merchant 234 has a means to receive the monetary amount. In one embodiment, merchant 234 provides, in the merchant transaction information, fund-receiving information including, but not limited to, electronic fund transfer information or bank account information. Transaction verifier 270 checks the electronic fund transfer company or the bank to see if merchant 234 has a means to receive the monetary amount.

In one embodiment, if transaction verifier 270 successfully checks that the necessary resources are extant to complete the transaction. Transaction verifier 270 presents customer 232 with the customer resource information, including, but not limited to, the current customer resource information and the new customer resource information and whether or not the transaction is completed. In one embodiment, transaction verifier 270 asks customer 232 to agree to proceed.

In one embodiment, transaction verifier 270 presents to merchant 234 the merchant resource information, including the current merchant resource information and the new merchant resource information if the transaction is completed. In one embodiment, transaction verifier 270 asks merchant 234 to agree to proceed.

Transaction approver 280 approves the transaction. In one embodiment, transaction module 240 is a credit card transaction system. Customer 232 has a credit card account with transaction module 240. The credit card account information is stored in datastore 256. Transaction approver 280 retrieves, from the datastore 256, the credit card account information of customer 232. Transaction approver 280 deducts the monetary amount from the credit card account information of customer 232, stores the new credit card account information of customer 232 in datastore 256. In another embodiment, the customer transaction information includes, but is not limited to, credit card information or debit card information. Transaction approver 280 informs the credit card company or the debit card company of customer 232 to deduct the monetary amount from the credit card account of customer 232 or the debit card account of customer 232.

Transaction approver 280 approves the transaction to merchant 234. In one embodiment, transaction approver 280 transfers the monetary amount to merchant 234. In another embodiment, the merchant transaction information includes, but is not limited to, merchant fund transfer information. Transaction approver 280 transfers the monetary amount using the merchant fund transfer information. In one embodiment, the merchant transaction information includes, but is not limited to, a fund transfer schedule. Transaction approver 280 schedules the fund transfer according to the fund transfer schedule.

In one embodiment, transaction approver 280 creates a transaction approval record. The transaction approval record includes, but is not limited to, a transaction approval identity identifying the approved transaction. Transaction approver 280 stores the transaction approval record in datastore 256. In one embodiment, the transaction approval record includes, but is not limited to, the customer transaction information and the merchant transaction information.

Transaction notifier 290 sends a message to customer 232 of the completion of the transaction. In one embodiment, the message includes, but is not limited to, the transaction approval identity. In one embodiment, the message includes, but is not limited to, the customer transaction summary information.

Transaction notifier 290 sends a message to merchant 234 of the completion of the transaction. In one embodiment, the message includes, but is not limited to, the transaction approval identity. In one embodiment, the message includes, but is not limited to, the merchant transaction summary information.

Transaction module 240 completes the transaction approval process. In one embodiment, transaction module 240 terminates the communications with customer 232. In one embodiment, transaction module 240 terminates the communications with merchant 234.

A System for Commercial Transactions Over a Call

Figure 3:
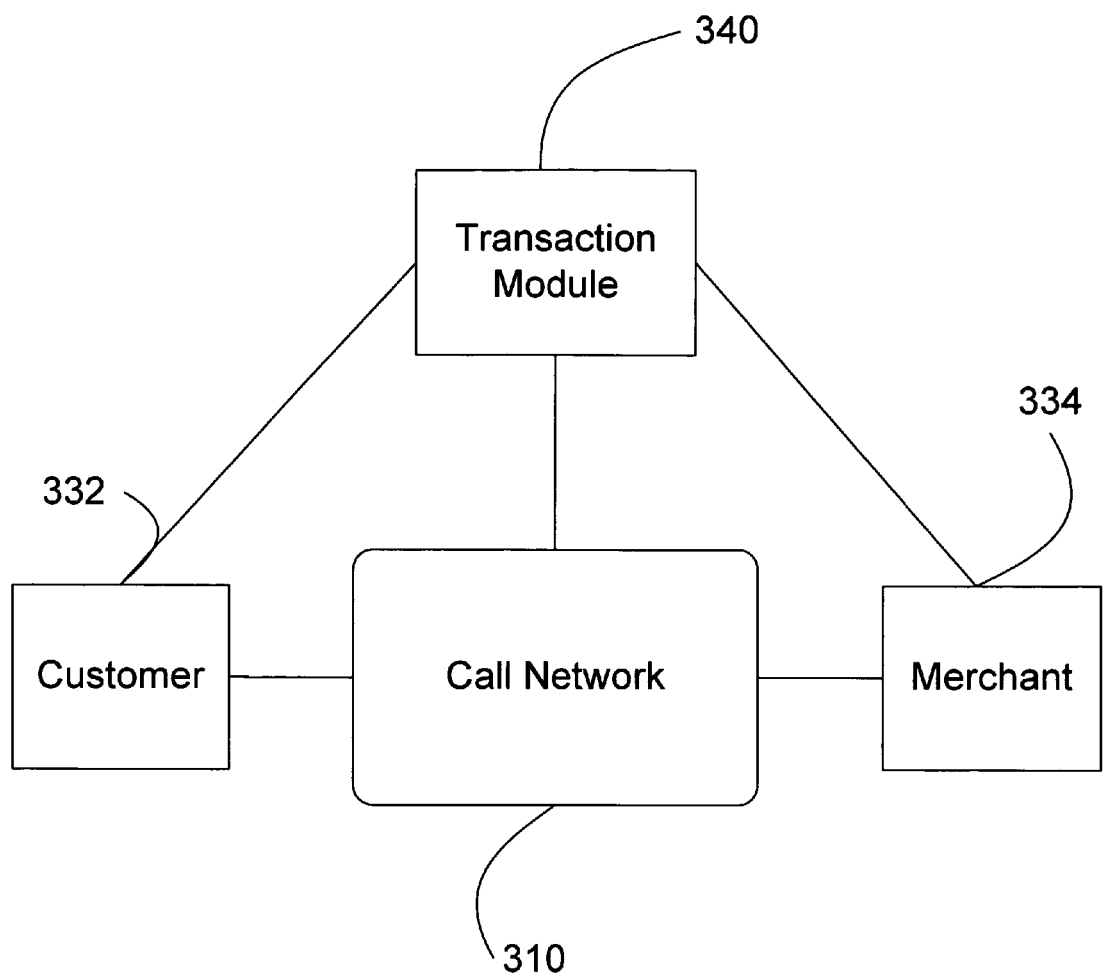
FIG. 3 is a diagram illustrating a system for conducting a secure commercial transaction over a call according to one embodiment of the present invention.

FIG. 3 illustrates a system for processing a commercial transaction over a call. Customer 332 conducts a call with merchant 334. Either customer 332 or merchant 334 represents functionality or devices analogous or similar to either user terminal 132 or user terminal 134. During the call, customer 332 buys goods or services from merchant 334. Merchant 334 computes the monetary amount for the goods or services the customer 332 would like to buy. In one embodiment, merchant 334 computes a merchant transaction identity for the commercial transaction. In one embodiment, merchant 334 identifies customer 332 using a customer identity in the commercial transaction.

When customer 332 is ready to pay for the goods, merchant 334 can provide customer 332 with a merchant identity. In one embodiment, merchant 334 can provide the merchant transaction identity and the monetary amount. In another embodiment, customer 332 can provide merchant 334 with a customer identity in the commercial transaction. Customer 332 can inform call network 310 to connect to transaction module 340. In one embodiment call network 310 can suspend the call between customer 332 and merchant 334 before connecting to transaction module 340. In another embodiment, call network 310 can place the call to merchant 334 on hold, can create a call to transaction module 340, and can switch customer 332 to the call to transaction module 340. In yet another embodiment, call network 310 can create a call between customer 332 and transaction module 340. Customer 332 can switch to the call to transaction module 340. Transaction module 340 can execute a transaction approval as described herein.

When the transaction is approved, call network 310 can terminate the call to transaction module 340. In one embodiment, transaction module 340 can drop the call to transaction module 340. In another embodiment, customer 332 can drop the call to transaction module 340.

In one embodiment, customer 332 can resume the call to merchant 334. In one embodiment, call network 310 can switch customer 332 to the call with merchant 334. In another embodiment, customer 332 can switch the call to merchant 334.

Paying Using a Call

Customer 332 has a transaction with merchant 334. In one embodiment, merchant 334 is a restaurant. Customer 332 finishes a meal in the restaurant and is ready to pay for the meal. In another embodiment, merchant 334 is a retail store. Customer 332 is ready to pay for the goods. Merchant 334 provides customer 332 the merchant identity. In one embodiment, merchant 334 provides the monetary amount of the payment. In another embodiment, merchant 334 further provides a merchant transaction identity. In one embodiment, customer 332 provides merchant 334 a customer identity. Customer 332 makes a call to transaction module 340 and it is not necessary for merchant 334 to be connected to call network 310 at the time of the transaction. In one embodiment, merchant 334 does not need to be connected to transaction module 340 or call network 310 at the time of the transaction. Transaction module 340 executes a transaction approval for the transaction, as described herein.

In one embodiment, customer 332 wants to give a gratuity tip for services received. In one embodiment, during the transaction approval process, the customer transaction information includes an additional final monetary amount larger than the monetary amount. In an embodiment, after transaction information gatherer 260 presents to customer 332 the customer transaction summary information, which includes, but is not limited to, the monetary amount of the payment, customer 332 provides a final monetary amount larger than the presented monetary amount. Customer 332 indicates in the final monetary amount the gratuity. In the same embodiment, transaction verifier 270 and transaction approver perform the steps using the final monetary amount, instead of the monetary amount. In another embodiment, transaction notifier includes, but is not limited to, the final monetary amount and the monetary amount in the customer transaction summary information, and in the merchant transaction summary information.

A System to Notarize a Document

Customer 332 has a document to notarize. In one embodiment, the document is an agreement with merchant 334. In another embodiment, the document is a legal document needing certification. In such embodiment, there is often no need for merchant 334 to present information to customer 332. In one embodiment, merchant 334 does not need to be connected to call network 310 or transaction module at the time of the transaction.

Customer 332 makes a call to transaction module 340. Transaction module 340 executes a transaction approval process as described herein. In one embodiment, the customer transaction information includes, but is not limited to, an electronic signature, an electronic verification identity of the customer, and an electronic copy of the document. In another embodiment, the customer transaction information includes, but is not limited to, an electronic signature, a merchant identity, and a merchant transaction identity. The merchant transaction information includes, but is not limited to, a document.

In one embodiment, transaction verifier 270 verifies the electronic signature. Transaction verifier 270 determines a signature of the customer. In one embodiment, the electronic verification identity includes, but is not limited to, a signature of the customer. In another embodiment, transaction verifier 270 obtains a pre-stored electronic signature of the customer, using the electronic verification identity of the customer. Transaction verifier 270 matches the electronic signature against the signature of the customer. In one embodiment, the electronic signature includes, but is not limited to, a fingerprint. Transaction verifier 270 obtains a fingerprint of the customer, using the verification identity of the customer. In another embodiment, the electronic signature includes, but is not limited to, a picture of the customer, and the electronic verification identity can be a photocopy of a driver's license. Transaction verifier 270 extracts the picture in the photocopy of a driver's license. Transaction verifier 270 matches the electronic picture and the extracted picture. Transaction approver 280 stores the electronic signature, the electronic verification identity and the document in datastore 256.

In one embodiment, transaction notifier 280 informs the customer 332 of the transaction approval identity. Customer 332 can give the transaction approval identity to other entities to query transaction module 340 for the notarization record.

In one embodiment, the document is a power of attorney, an affidavit, a will or a trust. In another embodiment, the document can be a business agreement, a contract, or a real estate escrow document.

A System to Monitor Electronic Voting

Figure 4:
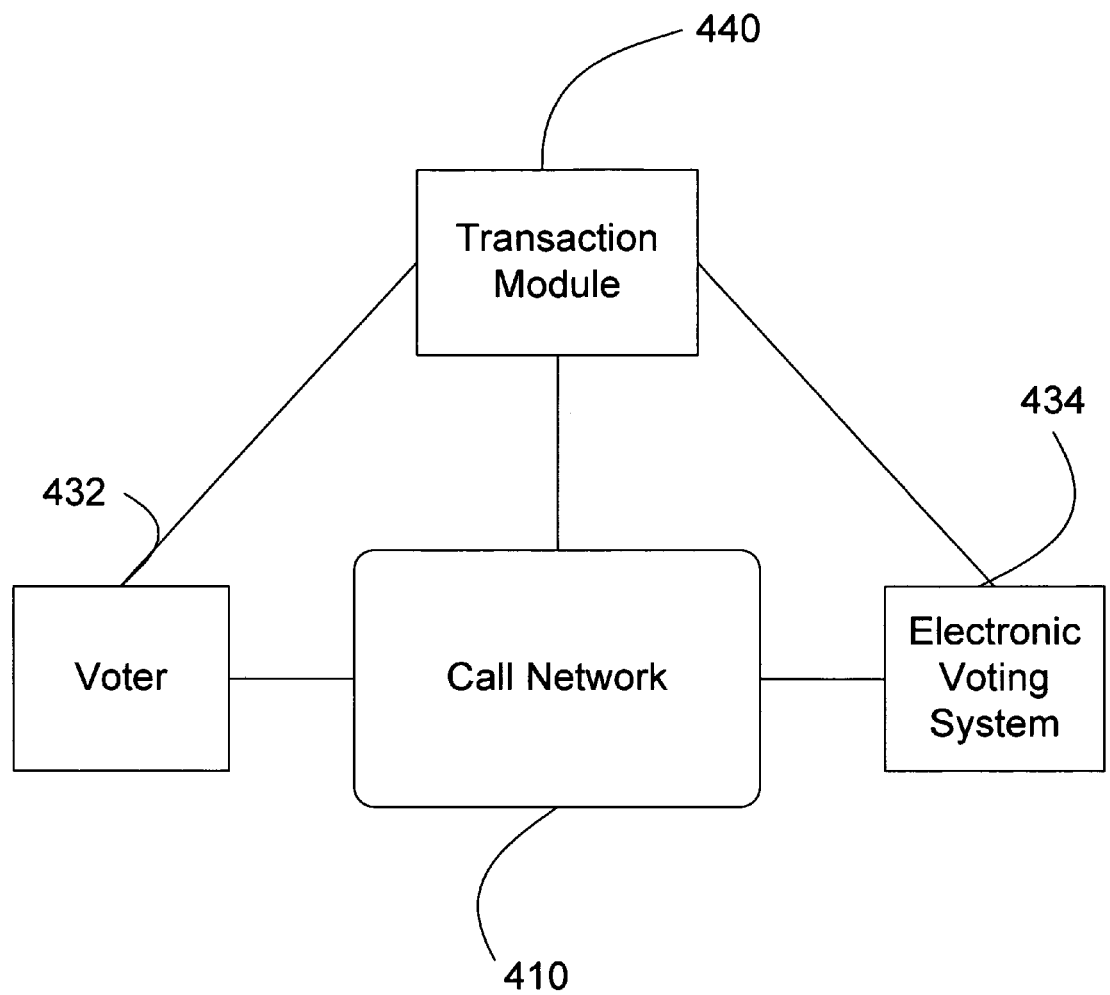
FIG. 4 is a diagram illustrating a system for monitoring electronic voting system according to one embodiment of the present invention.

FIG. 4 illustrates a system to monitor an election. The election uses an electronic voting system 434. Each voter can vote only as many times as allowed by the rules of the election. Each voter has a unique voter identity. Voter 432 votes using a electronic voter system 434 over a call through call network 410. During the voting process, voter 432 connects to transaction module 440. Transaction module 440 executes a transaction approval process as described herein. Voter 432 plays a role analogous to that of customer 232 and voter system 434 plays a role analogous to that of merchant 234.

Transaction module 440 has a plurality of voter identities in datastore 256. Transaction approver 280 stores transaction approval records in datastore 256. A transaction approval record includes, but is not limited to, voter identity. Voter 432 provides, in the customer transaction information, the voter identity, and the identity of the voter system 434. Transaction verifier 270 matches the voter identity against the voter identities in datastore. If there is a match, transaction verifier 270 further matches against the voter identities of transaction approval records in datastore. If there is no matching transaction approval record, transaction verifier determines that the necessary resources to complete the transaction are extant.

In one embodiment, transaction verifier 270 determines there is a matching transaction approval record. Transaction verifier 270 determines there the necessary resources to complete the transaction are not extant.

In one embodiment, transaction module 440 informs voter 432 of an incomplete transaction approval. In another embodiment, transaction module 440 informs voter 432 that there was a vote using the voter identity of voter 432.

In one embodiment, transaction module 440 informs voter system 434 of the incomplete transaction approval. In another embodiment, transaction module 440 informs voter system 434 that there was a vote using the voter identity of voter 432.

A System to Monitor a Document Checkout

Figure 5:
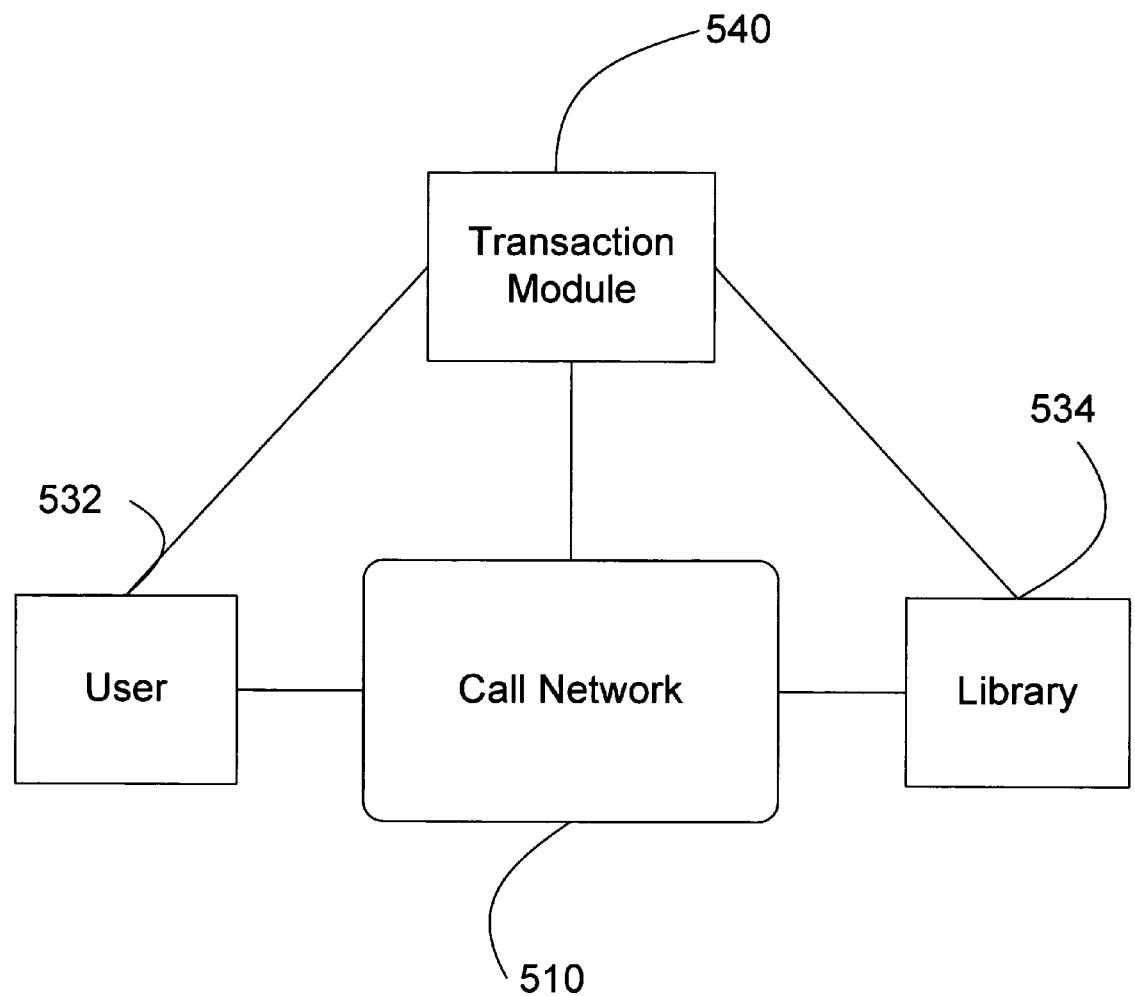
FIG. 5 is a diagram illustrating a system for monitoring a checkout system according to one embodiment of the present invention.

FIG. 5 illustrates a system to monitor a document checkout procedure. A user 532 wants to check out a document from a library 534, from call network 510. The library 534 provides user 532 with document information, a library identity, and a library checkout identity. User 532 provides library 534 a user identity used for the document checkout. User 532 connects to transaction module 540. Transaction module 540 executes a transaction approval process as described herein. User 532 plays a role analogous to that of customer 232; library 534 plays the role analogous to that of merchant 234; the library identity plays the role analogous to that of merchant identity; library checkout identity plays the role analogous to that of the merchant transaction identity. Customer transaction information includes, but is not limited to, the document information. In one embodiment, transaction verifier 270 is not necessary.

A System to Monitor a Document Exchange

Figure 6:
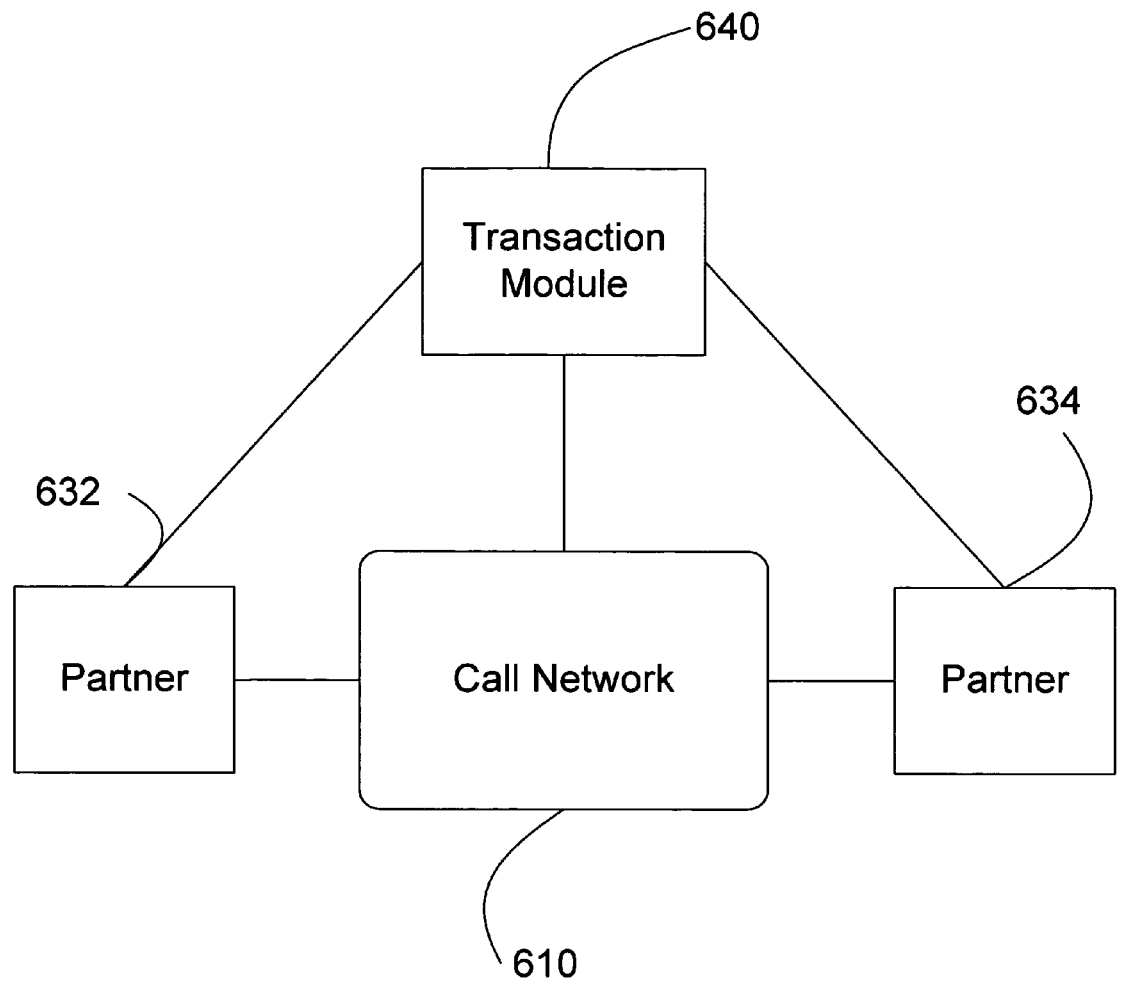
FIG. 6 is a diagram illustrating a system for conducting a document exchange according to one embodiment of the present invention.

FIG. 6 illustrates a system to monitor a document exchange between two partners. A first partner 632 wants to exchange a first document for a second document from a second partner 634. First partner 632 provides to second partner 634 an identity of first partner 632. Second partner 634 provides to first partner 632 an identity of second partner 634. First partner 632 and second partner 634 agree to exchange the document under a supervision of an independent monitor entity not related to first partner 632 or second partner 634. Transaction module 640 is not related to, owned by or under the control of first partner 632 or second partner 634.

First partner 632 connects to transaction module 640. Transaction module 640 executes a transaction approval process as described herein.

First partner 632 plays the role analogous to that of customer 232; partner 634 plays the role analogous to that of merchant 234. Customer transaction information includes, but is not limited to, first document information. Merchant transaction information includes, but is not limited to, second document information.

In the foregoing, transaction module 240 communicates with customer 232 and merchant 234. The communication session is over a communication network. In one embodiment, the communication is through the call network. In another embodiment, the communication is through another network. The communication sessions to transaction module 240 involve exchange of information between transaction module 240 and customer 232, and between transaction module and merchant 234. In one embodiment, the communication sessions can be data communication sessions. In such an embodiment, the communication network includes, but is not limited to, a data network.

In one embodiment, a communication session between customer 232 and merchant 234 to transaction module 240 is secure. In one embodiment, the communication session can be encrypted. In one embodiment, some portion of the communication session can be encrypted. In another embodiment, call network or the communication network can perform the encryption. In another embodiment, transaction module 240, customer 232 or merchant 234 performs the encryption.

A Method for Conducting a Transaction Approval Over a Call

Figure 7:
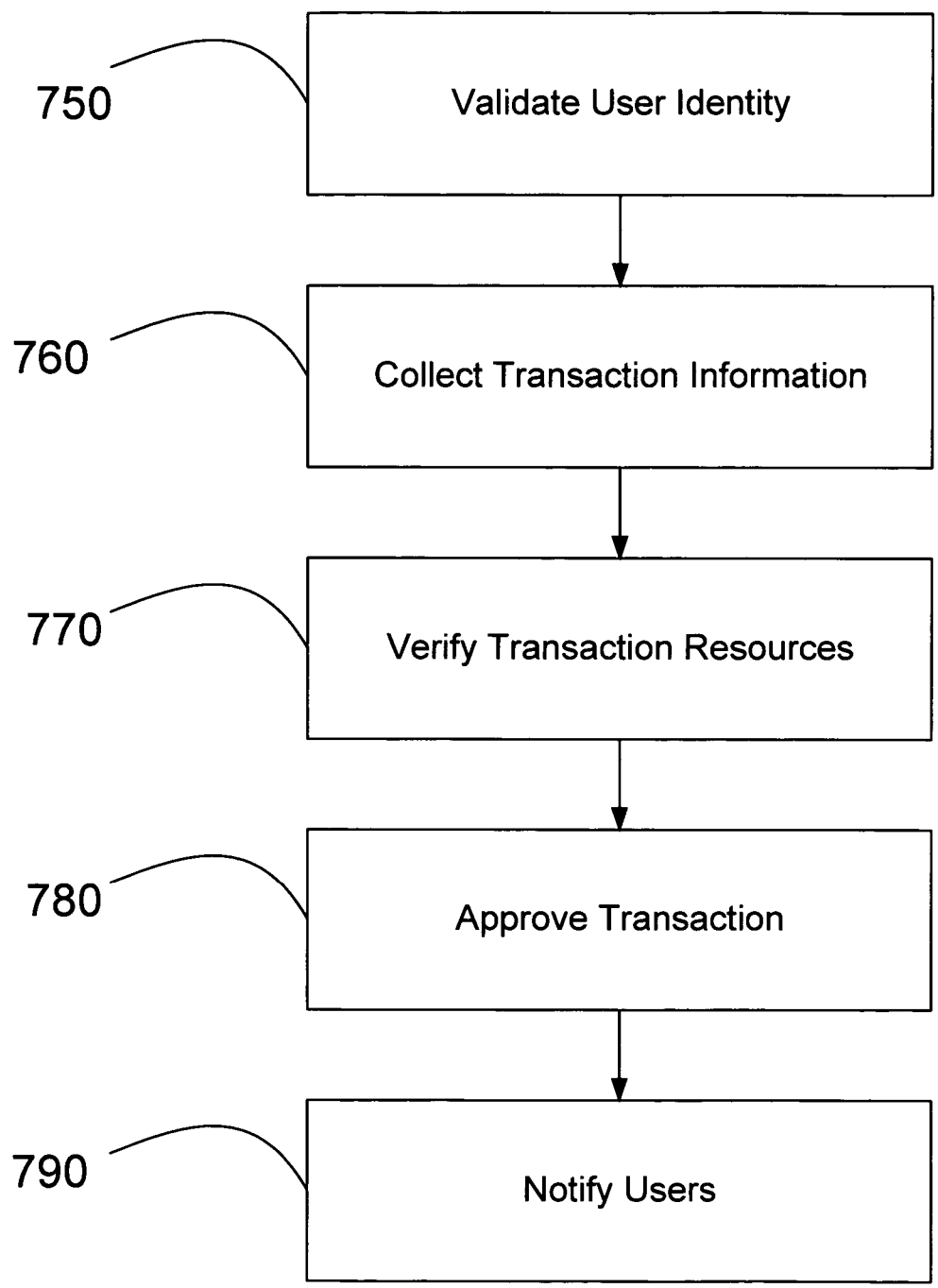
FIG. 7 is a diagram illustrating a method of conducting a secure transaction over a call according to one embodiment of the present invention.

FIG. 7 is a block diagram of a method of conducting a transaction approval over a call according to one embodiment of the present invention. At validate user identity step 750, the identity of a customer is checked and confirmed. In one embodiment, a user provides a user identity that is checked against a previously stored user identity. In one embodiment, the user does not have to actively provide the user identity and the user identity is provided automatically. In one embodiment, the user identity is automatically provided by caller identification systems well known in the current art.

At collect transaction information step 760, customer transaction information, merchant transaction information or other transaction information is collected. In one embodiment, customer transaction information includes, but is not limited to, a customer identity used in the transaction and a merchant identity to be used in the transaction. In one embodiment, customer transaction information includes, but is not limited to, a merchant transaction identity. In another embodiment, transaction information includes, but is not limited to monetary amount. In another embodiment, the merchant provides merchant transaction information including, but not limited to, a merchant transaction identity or a monetary amount. In one embodiment, up to all customer transaction information, merchant transaction information or other transaction information is verified. In one embodiment, the customer or the merchant verifies up to all customer transaction information, merchant transaction information or other transaction information.

In one embodiment, the customer is provided with a customer transaction summary information or merchant transaction summary information that summarizes up to all the transaction information gathered or used in the transaction. In one embodiment, the customer transaction summary information includes, but is not limited to, the customer identity used in the transaction, the merchant identity used in the transaction and the merchant transaction identity. In one embodiment, the customer transaction summary information also includes a monetary amount. In another embodiment, the customer transaction summary information includes additional customer related information included in the customer transaction information, such as payment information. In one embodiment, the customer transaction summary information includes additional merchant related information in the merchant transaction information such as payment information, product information, shipment information, schedule information or instruction information. In another embodiment, the customer is prompted to approve continuation of the transaction.

In one embodiment, the merchant is provided with customer transaction information or merchant transaction summary information that summarizes merchant related information in the customer transaction information and the merchant transaction information. In one embodiment, the merchant transaction summary information includes, but is not limited to, the customer identity used in the transaction, the merchant identity used in the transaction, the merchant transaction identity. In another embodiment, the merchant transaction summary information also includes the monetary amount. In one embodiment, the merchant transaction summary information includes additional merchant related information included in the customer transaction information, such as shipment information, schedule information or instruction information. In one embodiment, the merchant transaction summary information includes additional merchant related information in the merchant transaction information such as fund receiving information, product information, shipment information, schedule information or instruction information. In one embodiment, merchant is prompted to approve continuation of the transaction.

At step verify transaction resources step 770, the customer resources necessary to complete the transaction are checked or verified. In one embodiment, the customer resources necessary to complete the transaction are checked or verified. In one embodiment, customer credit or customer funds are checked for sufficient credit or funds to pay the monetary amount. In one embodiment, the merchant resources necessary to complete the transaction are checked or verified. In one embodiment, merchant means to receive the monetary amount are checked or verified. In one embodiment, merchant provides, in the merchant transaction information, fund-receiving information including, but not limited to, electronic fund transfer information or bank account information. Merchant electronic funds transfer company or banks are checked to ensure merchant has means to receive the monetary amount.

In one embodiment, if the check of the necessary resources to complete the transaction is successful, customer is presented with customer resource information, including, but not limited to, the current customer resource information and the new customer resource information if the transaction is completed. In another embodiment, the customer is prompted to approve continuation of the transaction. In one embodiment, if the check of the necessary resources to complete the transaction is successful the merchant is presented with the merchant resource information including, but not limited to, the current merchant resource information and the new merchant resource information if the transaction is completed. In another embodiment, the merchant is prompted to approve continuation of the transaction.

In approve transaction step 780, the transaction is approved or otherwise processed. At this step in the process funds or credit are deducted or instructions are sent to deduct funds or credit from a customer's financial account. In one embodiment, the customer has a credit card account and credit card account information stored on a datastore. The credit card account information is retrieved from the datastore, a monetary amount is deducted from the credit card account information, and new credit card account information is stored in the datastore. The monetary amount, less any applicable transaction fees, is then transferred to the merchant. In one embodiment, the merchant transaction information includes, but is not limited to, merchant fund transfer information or merchant fund transfer schedule.

In another embodiment, a transaction approval record is created. The transaction approval record includes, but is not limited to, a transaction approval identity identifying the approved transaction. The transaction approval record is stored in datastore 256. In one embodiment, the transaction approval record includes, but is not limited to, the customer transaction information and the merchant transaction information.

At notify users step 790, a message of completion of the transaction is sent to the customer. In one embodiment, the message includes, but is not limited to, the transaction approval identity. In one embodiment, the message includes, but is not limited to, the customer transaction summary information.

At notify users step 790, a message of completion of the transaction is sent to the merchant. In one embodiment, the message includes, but is not limited to, the transaction approval identity. In one embodiment, the message includes, but is not limited to, the merchant transaction summary information.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

We claim:

1. A computer implemented method for conducting a secure document approval transaction during a telephone call conducted over a call network, comprising sequentially:
    (a) creating, by a customer terminal, a first telephone call to a merchant terminal;
    (b) initiating a document approval transaction, by the customer terminal, with the merchant terminal during the first telephone call between the customer terminal and the merchant terminal;
    (c) informing the call network, by the customer terminal, to connect the customer terminal to a transaction system;
    (d) placing, by the call network, the first telephone call from the customer terminal to the merchant terminal on hold;
    (e) creating, by the call network, a second telephone call from the customer terminal to the transaction system;
    (f) sending, by the customer terminal, to the transaction system, during the second telephone call between the customer terminal and the transaction system, a request to process the document approval transaction between the customer terminal and the merchant terminal;
    (g) storing, by the transaction system, an electronic signature of a customer;
    (h) processing the document approval transaction by the transaction system using a customer transaction information, wherein the customer transaction information comprises an electronic signature:
        (h1) obtaining, by the transaction system, the stored electronic signature of the customer;
        (h2) determining, by the transaction system, whether the obtained electronic signature matches the electronic signature from the customer transaction information,
        (h3) based on the determining that the obtained electronic signature matches the electronic signature from the customer transaction information, storing by the transaction system a notarization record associated with a transaction approval identity, and
        (h4) sending, by the transaction system, the transaction approval identity to the customer terminal; and
    (i) resuming, by the call network, the first telephone call between the customer terminal and the merchant terminal.

2. The method of claim 1 wherein the processing further comprises prompting by the transaction system the customer terminal and the merchant terminal to approve continuation of the document approval transaction.

3. The method of claim 1, wherein the resuming comprises:
    after completion of the processing of the document approval transaction by the transaction system, terminating by the call network the telephone call between the customer terminal and the transaction system; and
    resuming by the call network the telephone call between the customer terminal and the merchant terminal.

4. The method of claim 1, wherein the customer transaction information further comprises an electronic verification identity of the customer, wherein the obtaining (h1) comprises:
    (h1i) obtaining by the transaction system the stored electronic signature of the customer using the electronic verification identity of the customer.

5. The method of claim 4, wherein the customer transaction information further comprises a document to be verified, wherein the storing (h3) comprises:
    (h3i) based on the determining that the obtained electronic signature matches the electronic signature from the customer transaction information, storing by the transaction system the electronic signature of the customer from the customer transaction information, the electronic verification identity of the customer, and the document in the notarization record, the notarization record associated with the transaction approval identity.

6. The method of claim 5 wherein the sending comprises:
    providing by the transaction system a transaction summary to said customer terminal or said merchant terminal.

7. The method of claim 1, further comprising:
    (j) sending by the customer terminal the transaction approval identity to another entity for querying the transaction system for the notarization record.

8. The method of claim 1, wherein the call network comprises a telephone switch, wherein the method comprises one or more of the following:
    (d1) placing the first telephone call from the customer terminal to the merchant terminal on hold by the telephone switch; and
    (e1) creating the second telephone call from the customer terminal to the transaction system by the telephone switch.

9. A computer program product comprising a non-transitory computer useable storage medium having at least one computer readable program for conducting a secure document approval transaction during a telephone call conducted over a call network, wherein when the at least one computer readable program is executed by at least one computer causes the computer to perform the following steps of:
    (a) creating, by the customer terminal, a first telephone call to a merchant terminal;
    (b) initiating a document approval transaction, by the customer terminal, with the merchant terminal during the first telephone call between the customer terminal and the merchant terminal;

(c) informing the call network, by the customer terminal, to connect the customer terminal to a transaction system;
(d) placing, by the call network, the first telephone call from the customer terminal to the merchant terminal on hold;
(e) creating, by the call network, a second telephone call from the customer terminal to the transaction system;
(f) sending, by the customer terminal, to the transaction system, during the second telephone call between the customer terminal and the transaction system, a request to process the document approval transaction between the customer terminal and the merchant terminal;
(g) storing, by the transaction system, an electronic signature of a customer;
(h) processing the document approval transaction by the transaction system using a customer transaction information, wherein the customer transaction information comprises an electronic signature:
   (h1) obtaining, by the transaction system, the stored electronic signature of the customer,
   (h2) determining, by the transaction system, whether the obtained electronic signature matches the electronic signature from the customer transaction information,
   (h3) based on the determining that the obtained electronic signature matches the electronic signature from the customer transaction information, storing, by the transaction system, a notarization record associated with a transaction approval identity, and
   (h4) sending, by the transaction system, the transaction approval identity to the customer terminal; and
(i) resuming, by the call network, the first telephone call between the customer terminal and the merchant terminal.

10. The product of claim 9, further comprising:
   after completion of the processing of the document approval transaction, terminating by the call network the telephone call between the customer terminal and the transaction system; and
   resuming by the call network the telephone call between the customer terminal and the merchant terminal.

11. The product of claim 9, wherein the customer transaction information further comprises an electronic verification identity of the customer, wherein the obtaining (h1) comprises:
   (h1i) obtaining the stored electronic signature of the customer using the electronic verification identity of the customer.

12. The product of claim 11, wherein the customer transaction information further comprises a document to be verified, wherein the storing (h3) comprises:
   (h3i) based on the determining that the obtained electronic signature matches the electronic signature from the customer transaction information, storing the electronic signature of the customer from the customer transaction information, the electronic verification identity of the customer, and the document in the notarization record, the notarization record associated with the transaction approval identity.

13. The product of claim 9, further comprising:
   (j) sending the transaction approval identity from the customer terminal to another entity for querying the transaction system for the notarization record.

* * * * *